(No Model.)
G. W. BLYTHE.
CURRY COMB.
No. 386,573. Patented July 24, 1888.
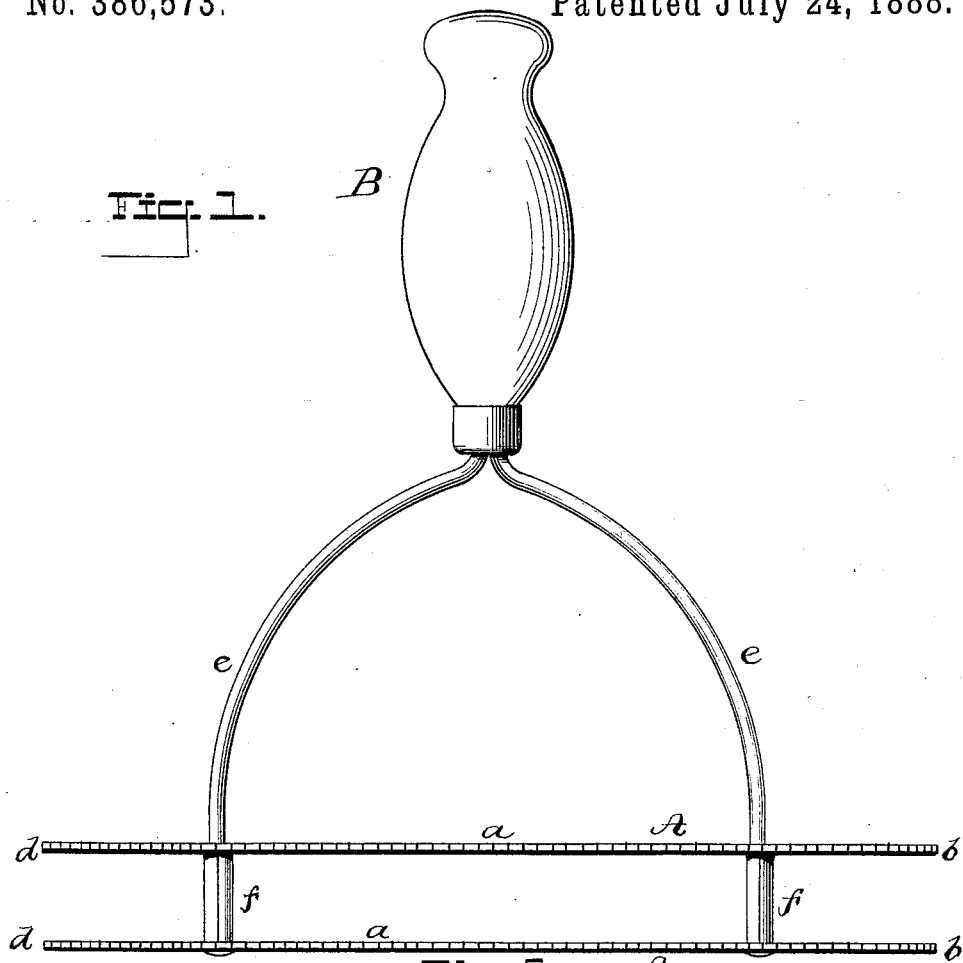
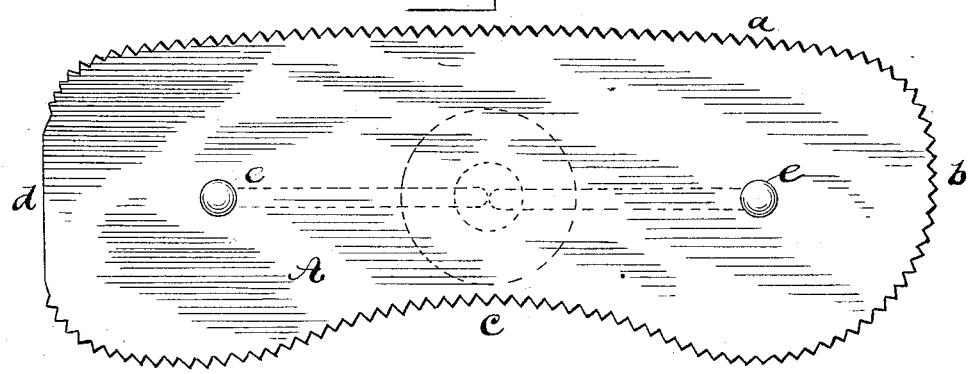
WITNESSES:
D. D. Mott
C. Sedgwick
INVENTOR.
G. W. Blythe
BY
Munn & Co.
ATTORNEY.

UNITED STATES PATENT OFFICE.

GEORGE WILLIAM BLYTHE, OF ASHLAND, MISSOURI.

CURRY-COMB.

SPECIFICATION forming part of Letters Patent No. 386,573, dated July 24, 1888.

Application filed April 30, 1888. Serial No. 272,226. (No model.)

*To all whom it may concern:*

Be it known that I, GEORGE WILLIAM BLYTHE, of Ashland, in the county of Boone and State of Missouri, have invented a new and Improved Curry-Comb, of which the following is a specification, reference being had to the annexed drawings, forming a part thereof, in which—

Figure 1 is a plan view of my improved curry-comb, and Fig. 2 is an end elevation.

Similar letters of reference indicate corresponding parts in both views.

The object of my invention is to provide a curry-comb which will be light, strong, and durable, not liable to accumulate dust, hair, or dirt, and readily cleaned; also, to provide working-edges of different curves adapted to fit different surfaces of the body of the animal.

My invention consists in the construction and arrangement of parts, as will be hereinafter fully described and claimed.

The plates A, of which the body of my improved curry-comb is formed, are preferably made of tempered steel, with a slightly-convex edge, $a$, a convex end, $b$, a concave edge, $c$, and a square end, $d$. The edges $a\ b\ c$ are serrated, and holes are formed near opposite ends for receiving the wires $e$ of the handle.

Two plates, A, are mounted upon the wires $e$, parallel with each other, and held in fixed position by bringing one of the plates against shoulders on the wires, placing thimbles $f$ between the plates, and riveting the wires down upon the outer face of the outer plate. The wires $e$ of the handle are curved inwardly toward each other and inserted in a wooden handle, B. The serrated edges $a\ b\ c$ are adapted to fit the inequalities of the body of the animal, and the plain ends $d$ serve as striking-surfaces while cleaning the comb. The adjacent faces of the plates A, being smooth and plain, do not hold any of the hair or dirt, so that the comb is always in a cleanly condition.

Having thus described my invention, I claim as new and desire to secure by Letters Patent—

1. As an improved article of manufacture, a curry-comb consisting of the handle B, wires $e\ e$, the two plates A at the outer ends of said wires, and the thimbles $f$, spacing the plates apart, each plate being serrated except at one end, $d$, convex on its upper edge, as at $a$, concave on its lower edge, as at $c$, and rounding at its serrated end, as shown at $b$, substantially as set forth.

2. As a new article of manufacture, the plates A, having a plain edge, $d$, at one end, a serrated rounding edge, $b$, at its opposite end, a serrated convex top edge, $a$, and a serrated concave lower edge, substantially as set forth.

GEORGE WILLIAM BLYTHE.

Witnesses:
W. P. BOQUA,
JO BAUMAN.